United States Patent
Asokan et al.

(10) Patent No.: US 10,926,403 B1
(45) Date of Patent: Feb. 23, 2021

(54) GRIPPING TOOL HAVING ADJUSTABLE GRIPPING AREA, AND RELATED METHODS

(71) Applicant: Amazon Technologies, Inc., Seattle, WA (US)

(72) Inventors: Arvin Asokan, Seattle, WA (US); Jon DeFant, Seattle, WA (US); Maxim Hoffman, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 272 days.

(21) Appl. No.: 16/169,499

(22) Filed: Oct. 24, 2018

(51) Int. Cl.
*B25J 15/00* (2006.01)
*B25J 9/10* (2006.01)
*B25J 15/06* (2006.01)
*B25J 5/00* (2006.01)
*B25J 18/00* (2006.01)

(52) U.S. Cl.
CPC .............. *B25J 9/1005* (2013.01); *B25J 5/00* (2013.01); *B25J 9/106* (2013.01); *B25J 15/0052* (2013.01); *B25J 15/0683* (2013.01); *B25J 18/005* (2013.01)

(58) Field of Classification Search
CPC ...... B25J 9/1005; B25J 9/106; B25J 15/0052; B25J 15/0683; B25J 18/005
USPC ................................................... 294/64.3, 65
See application file for complete search history.

(56) References Cited

U.S. PATENT DOCUMENTS

| 5,609,377 | A | * | 3/1997 | Tanaka | B65G 47/918 |
| | | | | | 294/65 |
| 10,611,580 | B1 | * | 4/2020 | Polido | B65G 47/917 |
| 2011/0291433 | A1 | * | 12/2011 | Feng | B25J 15/0616 |
| | | | | | 294/65 |
| 2019/0030730 | A1 | * | 1/2019 | Tanaka | B25J 15/0625 |
| 2020/0122317 | A1 | * | 4/2020 | Zaffaroni | B25J 17/0241 |
| 2020/0262069 | A1 | * | 8/2020 | Douglas | B25J 19/026 |

* cited by examiner

*Primary Examiner* — Paul T Chin
(74) *Attorney, Agent, or Firm* — BakerHostetler

(57) ABSTRACT

A gripping tool includes at least one linear guide coupled to a mount and extending along a central axis oriented along a first direction. At least one carriage coupled to the linear guide is translatable relative to the mount along the first direction. A first plurality of arms are rotatably coupled to the mount. A second plurality of arms are rotatably coupled to the carriage. The tool includes bodies carrying suction cups. Each body: defines an axis, is rotatably connected to at least one of each of the first and second pluralities of arms, and combines with the respective at least one of the first plurality of arms, the at least one of the second plurality of arms, and the at least one carriage to define a linkage allowing the body to move relative to the mount along the first and a perpendicular radial direction while the central and body axes remain parallel.

20 Claims, 8 Drawing Sheets

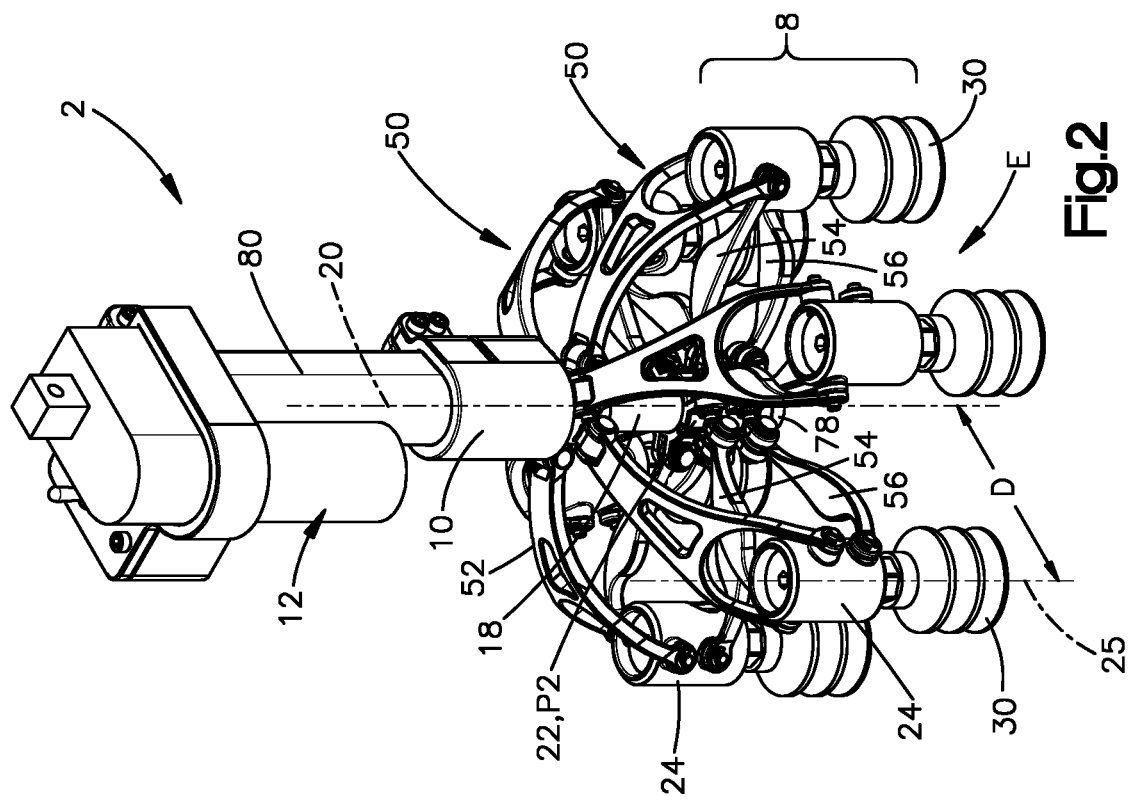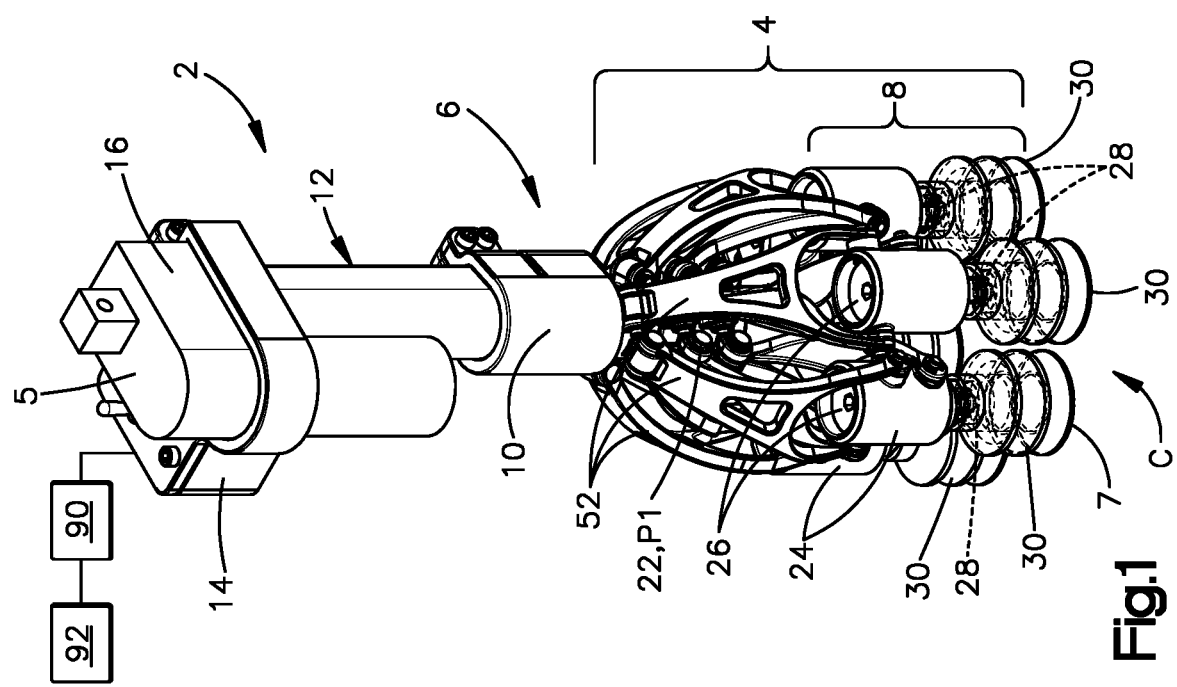

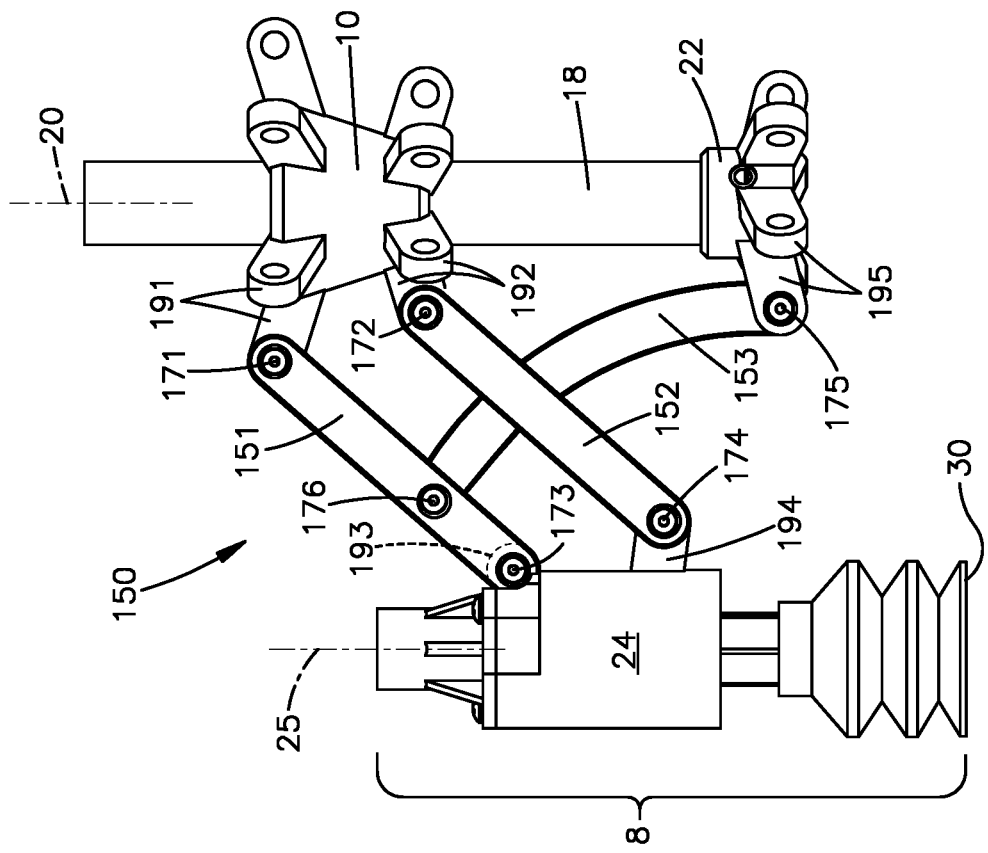
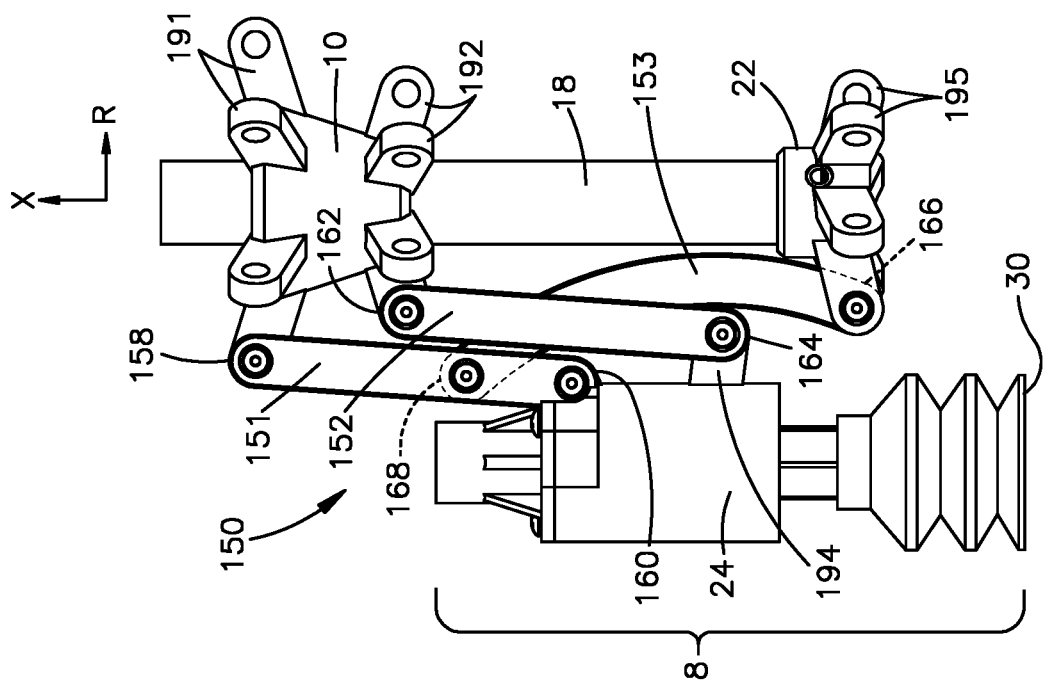

GRIPPING TOOL HAVING ADJUSTABLE GRIPPING AREA, AND RELATED METHODS

BACKGROUND

The present invention relates to automation, and more particularly to tools for engaging and lifting items via vacuum suction cups.

The robotics field has developed many tools for engaging and lifting items at the end of an end effector. For example, end effectors sometimes employ suction cups for engaging a surface of an item and using a negative or suction pressure or vacuum to engage and lift the item.

End-of-arm-tools that employ one or more suction cups have some limitations, as the force created by the suction cup is limited by the magnitude of the negative pressure and suction cup area. In an environment in which many items of different shapes and sizes are expected to be encountered, a large suction cup may be blocked from the desired item by other items or the container in which the items may be located, or the item may be too small to engage the entire circumference of the suction cup. And a small suction cup may not be able to generate the force required to lift a heavier item. Some prior art suction cup lifting tools address these problems by providing a large tool body with multiple banks of suction cups, wherein each bank is adapted, such as by the size of its suction cup(s) and the amount of negative pressure, to grip a surface area within a predetermined size range. However, such tools are large and bulky, as they require a single tool to house the various suction cup banks, only one of which is used at any one time to grip an item.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1 shows a perspective view of an end-of-arm tool in a first, contracted configuration, according to an embodiment of the present disclosure;

FIG. 2 shows a perspective view of the end-of-arm tool illustrated in FIG. 1 in a second, expanded configuration;

FIG. 8 shows a side plan view of a respective linkage of the gripping assembly illustrated in FIG. 7;

FIG. 9 shows a side plan view of the respective linkage illustrated in FIG. 8 in a second, expanded configuration;

DETAILED DESCRIPTION

Figure 3:
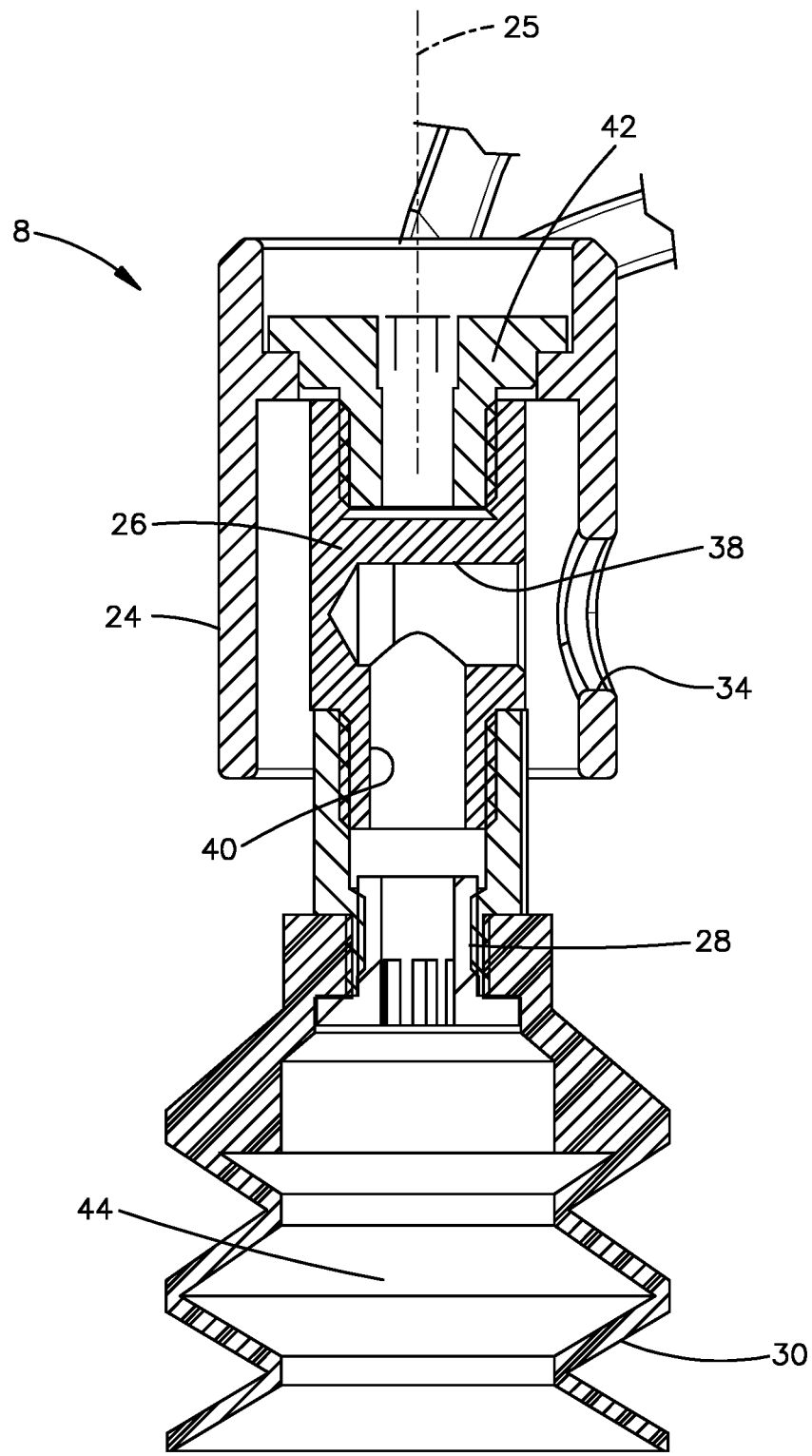
FIG. 3 shows a side sectional view of a suction cup assembly of the end-of-arm tool illustrated in FIG. 1.

The embodiments of the present disclosure pertain to end-of-arm tools that carry a plurality of suction cup assemblies that are each configured to move outwardly from and inwardly toward a central axis of the tool in a manner expanding and contracting a gripping area defined by the suction cup assemblies. This area-adaptability allows the tool to adjust the size of its gripping area, such as to maximize the size of the gripping area to match the maximum allowable area of a target surface of an item to be lifted by the tool, for example. By adapting the gripping area to the maximum target area of the item, the tool can achieve a more stable suction grip than prior art suction gripping devices.

The embodiments disclosed below also allow the tool to have a compact configuration when collapsed, which compactness is provided by certain parts, components, and/or features of the tool, particularly of a gripping assembly of the tool, having complimentary geometries that allow them to nest within other parts, components, and/or features of the tool, thereby conserving space within the tool, which allows more suction cup assemblies to be employed on the tool, which provides an enhanced distribution of suction cups on the target surface of an item to be lifted by the tool.

The embodiments disclosed below further include tool components that are configured for ease of manufacture with standard type manufacturing tools, such as computer numerical control (CNC) machines, by way of non-limiting example.

Referring now to FIGS. 1 and 2, an end-of-arm tool 2 includes an expandable gripping assembly 4 whose expansion and contraction are controlled by an actuation assembly 6. The tool 2 includes a proximal end 5 that is configured to be coupled to a robotic arm and a distal end 7 that includes the gripping assembly 4. The gripping assembly 4 includes a plurality of individual suction cup assemblies 8 that extend to the distal end 7 and are configured to grip a surface of an item, such as a package. Accordingly, the tool 2 can be referred to as a "gripping" tool. Additionally, the driven expansion and contraction of the gripping assembly 4 provides the tool 2 with a size-adjustable gripping area for targeting and gripping item surfaces of various sizes as needed.

The actuation assembly 6 includes a mounting structure 10, also referred to herein as a "mount," and a drive mechanism 12 that is coupled to the mount 10 and is configured to actuate movement of the suction cup assemblies 8. The actuation assembly 6 includes a bracket 14 which can be attached to a cowling 16 of the drive mechanism 12. The bracket 14 is configured to couple the drive mechanism 12, and thus the tool 2, to the robotic arm. The drive mechanism 12 includes a guide member, such as a linear guide member 18 that extends from the cowling 16 along a central axis 20. The linear guide member 18 is coupled to the mount 10 and to a carriage 22 of the actuation assembly 6. The carriage 22 is configured to translate relative to the mount 10 along a first direction X that is oriented along the central axis 20. In the embodiment shown in FIGS. 1 and 2, the carriage 22 and the linear guide member 18 are configured to translate together along the first direction X relative to the mount 10 and the cowling 16; although in other embodiments the carriage 22 can be configured to ride along (i.e., translate along and relative to) the linear guide member 18 along the first direction X relative to the mount 10 and the cowling 16.

As shown in FIG. 3, the suction cup assemblies 8 each include a body 24 affixed to a suction head 26 that defines or is connected to a suction cup mount 28. The body 24 defines a body axis 25 oriented along the first direction X. Suction cups 30 are mounted to the suction cup mounts 28. The suction cups 30 are preferably bellows-type suction cups that are compliant along the first direction X, although other suction cup types are within the scope of the embodiments disclosed herein. The body 24 can define an aperture 34 aligned with a fluid port 38 of the suction head 26. The fluid port 38 is in fluid communication with a plenum 40, which is in turn in fluid communication with a suction chamber 44 of the suction cup 30. The fluid port 38 is configured to receive a fluid coupling member, which can be in fluid communication with a tube or other means of placing the plenum 40 in fluid communication with a vacuum source. The fluid port 38 can also be configured to receive a fixation element, such as a screw or even a plug for occluding the fluid port 38, if desired. The suction head 26 can be coupled to a cap 42 that in turn couples the suction head 26 to the body 24.

Referring again to FIGS. 1 and 2, each suction cup assembly 8 is coupled to the actuation assembly 6 by a linkage 50. Thus, it can be said that the suction cup assemblies 8 are coupled to the actuation assembly 6 by a plurality of linkages 50. The linkages 50 are configured to adjust a distance D between each suction cup assembly 8 and the actuation assembly 6, which distance D is measured between the central axis 20 and the body axis 25 of the respective body 24 along a second or radial direction R that is perpendicular to the first direction X (and thus also perpendicular to the central axis 20). The distances D of each of the suction cup assemblies 8 are adjustable between a minimum distance, which occurs when the suction cup assemblies 8 are in a first, contracted configuration C (FIG. 1) with respect to the actuation assembly 6, and a maximum distance, which occurs when the suction cup assemblies 8 are in a second, expanded configuration E (FIG. 2) with respect to the actuation assembly 6. In the embodiment illustrated in FIGS. 1 and 2, linkages 50 are configured to expand and contract the radial position of the suction cup assemblies 8 in unison, although in additional embodiments described in more detail below the tool 2 can be configured to expand and contract the radial position of the suction cup assemblies 8 independently of each other.

The gripping assembly 4 includes a plurality of arms that connect the suction cup assemblies 8 to the actuation assembly 6. The arms include a first plurality of arms and a second plurality of arms. The first plurality of arms are each rotatably coupled to the mount 10, while the second plurality of arms are each rotatably coupled to the carriage 22. It is to be appreciated that the first plurality of arms can be referred to as "upper" arms, while the second plurality of arms can be referred to as "lower" arms. Thus, each arm of the first plurality of arms can be referred to as an "upper" arm, while each arm of the second plurality of arms can be referred to as a "lower" arm. Each linkage 50 includes at least one of the first plurality of arms, which rotatably connect(s) the respective body 24 to the mount, and at least one of the second plurality of arms, which rotatably connect(s) the respective body 24 to the carriage 22.

Figure 4:
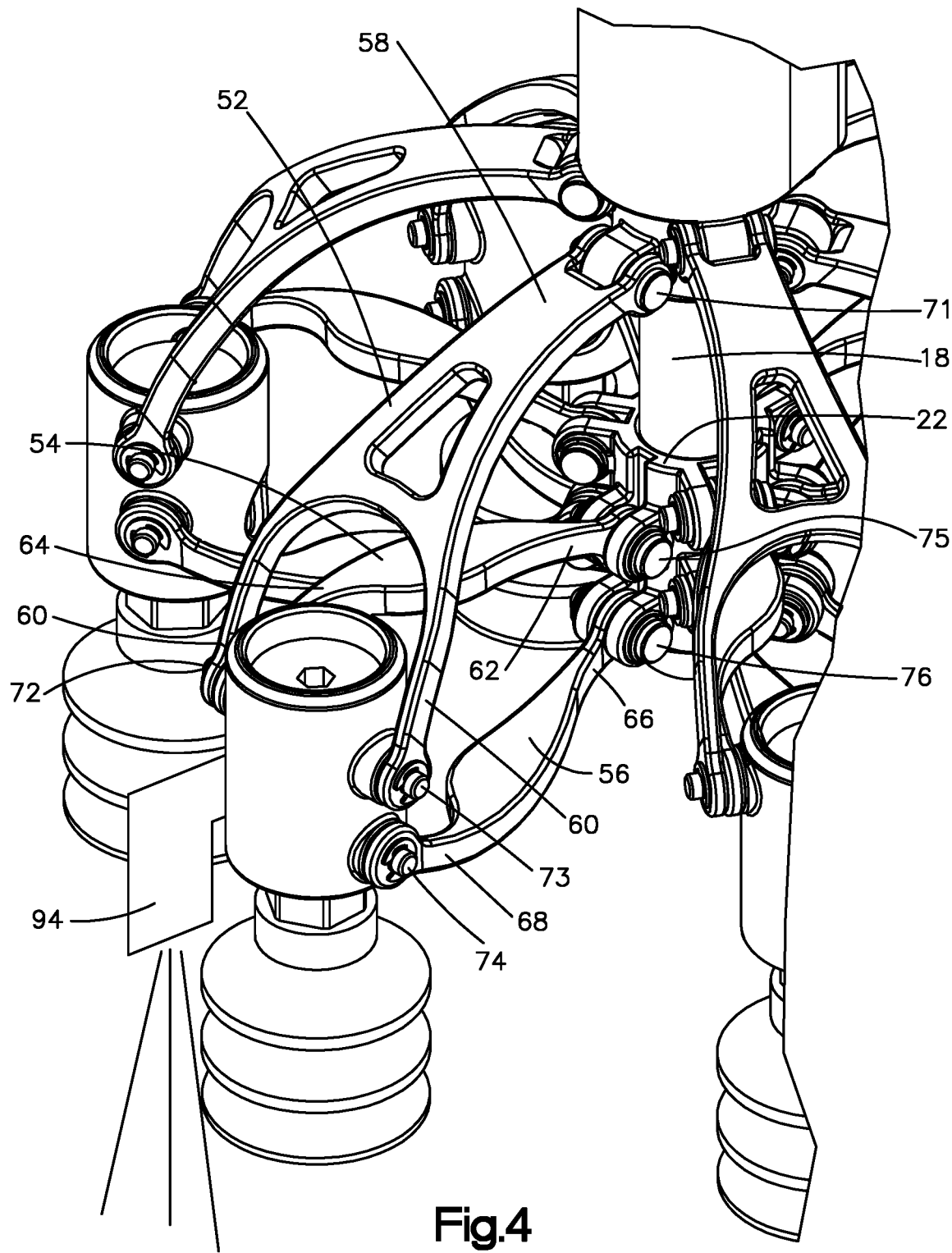
FIG. 4 shows an enlarged perspective view of a linkage of the end-of-arm tool illustrated in FIG. 2.

Referring now to FIG. 4, in the present embodiment, each linkage 50 includes an upper arm 52, a first lower arm 54, and a second lower arm 56. The first and second lower arms 54, 56 are also referred to herein as a pair of lower arms 54, 56. It is to be appreciated that the body 24 also forms an arm of the linkage 50. In each linkage 50, the upper arm 52 has a first or proximal end 58 rotatably coupled to the mount 10 and a second or distal end 60 rotatably coupled to the body 24. The second end 60 of the upper arm 52 is preferably forked and is rotatably coupled to opposite sides of the body 24. The first lower arm 54 has a first end 62 rotatably coupled to the carriage 22 and a second end 64 rotatably coupled to the body 24. The second lower arm 56 has a first end 66 rotatably coupled to the carriage 22 and a second end 68 rotatably coupled to the body 24. The second ends 64, 68 of the first and second lower arms 54, 56 are preferably coupled to opposite sides of the body 24. The first and second lower arms 54, 56 are preferably configured to at least partially nest relative to each other in the contracted configuration C, thereby conserving space within the tool 2.

Each of the upper arms 52 can be rotatably coupled to the mount 10 and to their associated bodies 24 at joints, such as a plurality of pin joints, for example. The pin joints connecting the upper arms 52 to the mount 10 can be referred to as first pin joints 71, or alternatively as "upper" or "mount" pin joints 71. As shown, the first pin joints 71 can be staggered alternately with respect to the first direction X around a circumference of the mount 10, thereby further conserving space within the tool 2. In this manner, the number of upper arms 52, and thus the number of suction cup assemblies 8, carried by the tool 2 can be increased. The second, forked end 60 of each of the upper arms 52 can be rotatably coupled to the respective body 24 at second and third pin joints 72, 73 extending from opposite sides of the body 24. The second and third pin joints 72, 73 can be offset from one another with respect to the first direction X, thereby further conserving space within the tool 2, particularly in the contracted configuration C.

Additionally, each of the lower arms 52, 54, of the linkages 50 can be rotatably coupled to the carriage 22 and to their associated bodies 24 at additional joints, such as additional pin joints. To further conserve space, the second end 64 of the first lower arm 54 is preferably rotatably coupled to the body 24 at either the second or third pin join 72, 73 (shown at the second pin joint 72 in FIG. 4). Thus, the upper arm 52 and the first lower arm 54 share a pin joint that rotatably couples them to the body 24. The second end 68 of the second lower arm 56 can be rotatably coupled to the body 24 at a fourth pin joint 74, which is aligned with and distally spaced from the non-shared one of the second and third pin joints 72, 73 (which is the third pin joint in FIG. 4) along the first direction X. The first end of the first lower arm 54 is rotatably coupled to the carriage 22 at a fifth pin joint 75. The first end of the second lower arm 56 is rotatably coupled to the carriage 22 at a sixth pin joint 76, which is preferably aligned with and distally spaced from the fifth pin joint 75. The foregoing arm and pin arrangement of each linkage 50 provides that the carriage 22, the pair of lower arms 54, 56, and the body 24 cooperatively define a "four-bar linkage" that maintains the body axis 25 (and thus also the body 24) parallel with the central axis 20 and thus aligned along the first direction X during movement of the linkage 50 between the contracted and expanded configurations C, E. Additionally, the four-bar linkage causes the body 24 to move proximally along the first direction X as the body 24 moves outwardly along the radial direction R. The fifth and sixth pin joint 75, 76 pairs of the linkages 50 can be staggered alternately with respect to the first direction X around a circumference of the carriage 22 to yet further conserve space within the tool, particularly in the collapsed configuration C.

In the present embodiment, each linkage 50 is coupled to the carriage 22 so that translation of the carriage 22 along the linear guide member 18 moves each of the linkages 50, and thus each of the suction cups 30, in unison along the radial direction R, thereby increasing and decreasing a total gripping area as needed. The carriage 22 is configured to translate along the linear guide member 18 between a first translational position P1 (FIG. 1) and a second translational position P2 (FIGS. 2 and 4). When the carriage 22 is at the first translational position P1, the gripping assembly 4 is in the contracted configuration C (i.e., the body axis 25 of each body 24 is spaced from the central axis 20 at the minimum of distance D). When the carriage 22 is at the second translational position P2, the gripping assembly 4 is in the expanded configuration E (i.e., the body axis 25 of each body 24 is spaced from the central axis 20 at the maximum of distance D). In the illustrated embodiment, the first translational position P1 is adjacent a distal end of the mount 10, while the second translational position P2 is adjacent a distal end 78 of the linear guide member 18. The distal end 78 of the linear guide member 18, can include a stop member, such as a screw received in a transverse bore adjacent the distal end 78, by way of a non-limiting example.

Referring again to FIGS. 1 and 2, the drive mechanism comprises a linear actuator in communication with the carriage 22 so as to drive the carriage 22 along the linear guide member 18 (and thus along the first direction X) between the first and second translational positions P1, P2. The linear actuator 80 can be mechanically coupled, electromagnetically coupled, hydraulically coupled, and/or pneumatically coupled to the carriage 22. Accordingly, the linear actuator 80 can include a ball screw actuator, a lead screw actuator, a rack-and-pinion drive, a servo motor, a stepper motor, a solenoid, a hydraulic actuator, and/or a pneumatic actuator.

The tool includes a control unit 90, such as an electronic control unit in communication with a processor 92 for controlling operation of the tool 2, including actuation of the linear actuator 80 to control the expansion and contraction of the tool, as needed. In some embodiments, the control unit 90 can receive data from one or more sensors 94 (for example, optical, contact, proximity, or other sensor types) disposed on and/or around the gripping assembly 4, such as on the suction cup assemblies 8, and more particularly on one or more of the bodies 24 (as shown in FIG. 4). This data will be used by the control unit 90 to determine surface shapes of the item, so as to identify a target area of the item for gripping, and optionally to identify objects near the item. Optionally, each body 24 includes a proximity sensor 94 that indicates when the associated suction cup 30 is engaged with the target surface, and the control unit 90 can activate a vacuum pump associated with the respective suction cup 30 only once the sensor 94 indicates engagement. Alternatively, or additionally to the sensors 94 described above, the control system may receive data from a database of known item types.

Figure 5:
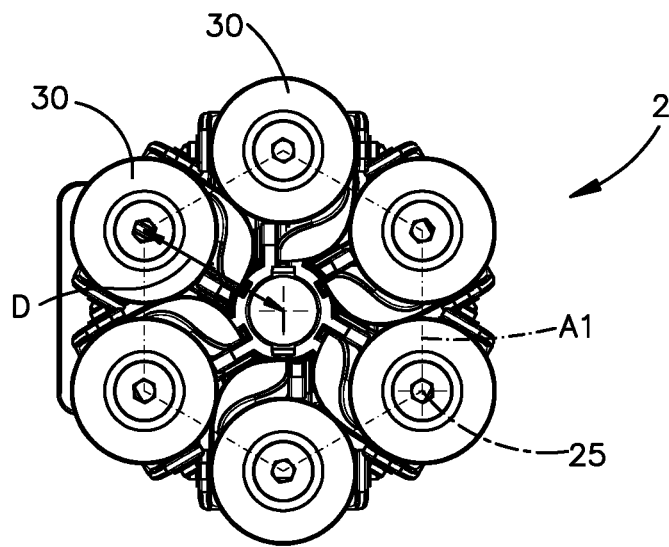
FIG. 5 shows a bottom plan view of the end-of-arm tool illustrated in FIG. 1 in the first, contracted configuration.
Figure 6:
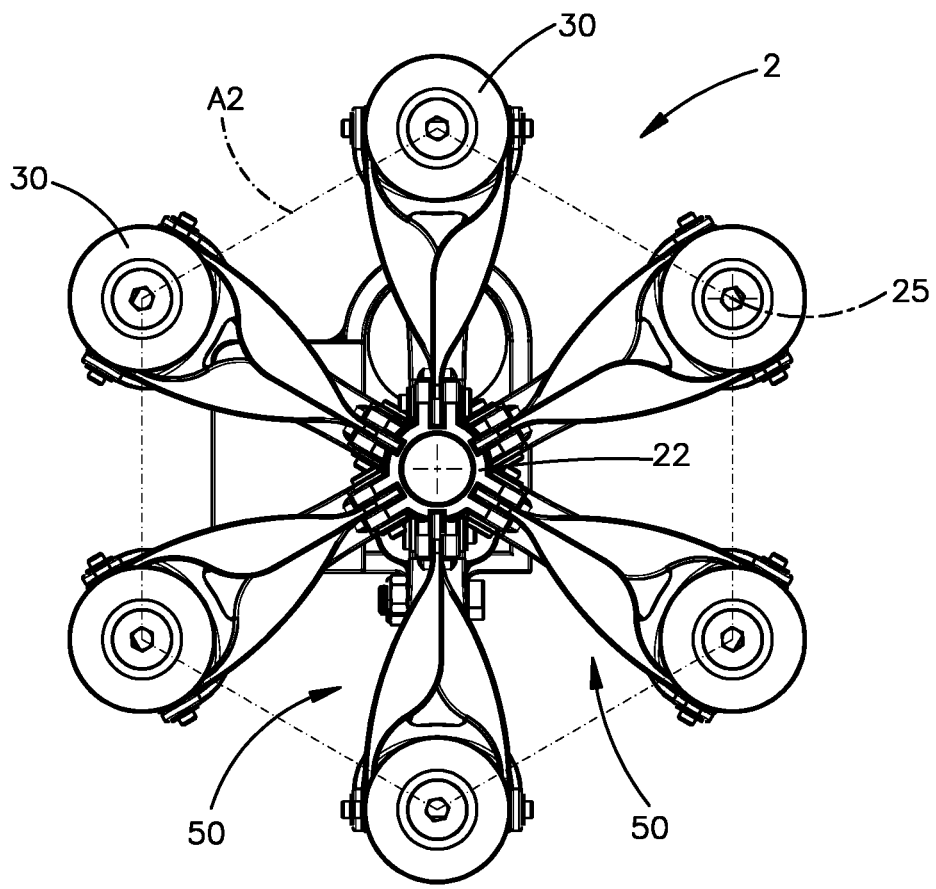
FIG. 6 shows a bottom plan view of the end-of-arm tool illustrated in FIG. 5 in the second, expanded configuration.

Referring now to FIGS. 5 and 6, the tool 2 can be configured such that the minimum and maximum distances D are substantially equivalent for each body 24. Additionally, the bodies 24, and thus the suction cup assemblies 8, and optionally also the linkages 50, can be evenly arranged around the central axis 20. When the distances D are equivalent and the angular positioning of the bodies 24 is uniform, the body axes 25 of the bodies 24 collectively define a regular polygon in a reference plane that is orthogonal to the central axis. Thus, it can be said that the gripping assembly 4, and thus the tool 2, defines a variable-size, regular polygonal gripping area, the size of which can be adjusted between a first or collapsed gripping area A1 (FIG. 5) and a second or expanded gripping area A2 (FIG. 6) as needed to grip a target surface of an item. It is to be appreciated that the collapsed gripping area A1 corresponds to the collapsed configuration C, which in turn corresponds to the first translational position P1 of the carriage 22, while the expanded gripping area A2 corresponds to the expanded configuration E, which in turn corresponds to the second translational position P2 of the carriage 22.

As shown, the gripping assembly 4 can include six linkages 50 (and thus six suction cup assemblies 8) arranged so as to define a regular hexagon gripping area. Alternatively, the gripping assembly 4 can include, three linkages 50 arranged so as to define an equilateral triangle gripping area, four linkages 50 arranged so as to define a square gripping area, five linkages 50 arranged so as to define a regular pentagon gripping area, seven linkages 50 arranged so as to define a regular heptagon gripping area, eight linkages 50 arranged so as to define a regular octagon gripping area, nine linkages 50 arranged so as to define a regular nonagon gripping area, ten linkages 50 arranged so as to define a regular decagon gripping area, or more than ten linkages 50 providing additional regular polygon gripping areas. It is to be appreciated, however, that the various linkages 50 can alternatively be configured to collectively define non-regular polygonal gripping areas.

Figure 7:
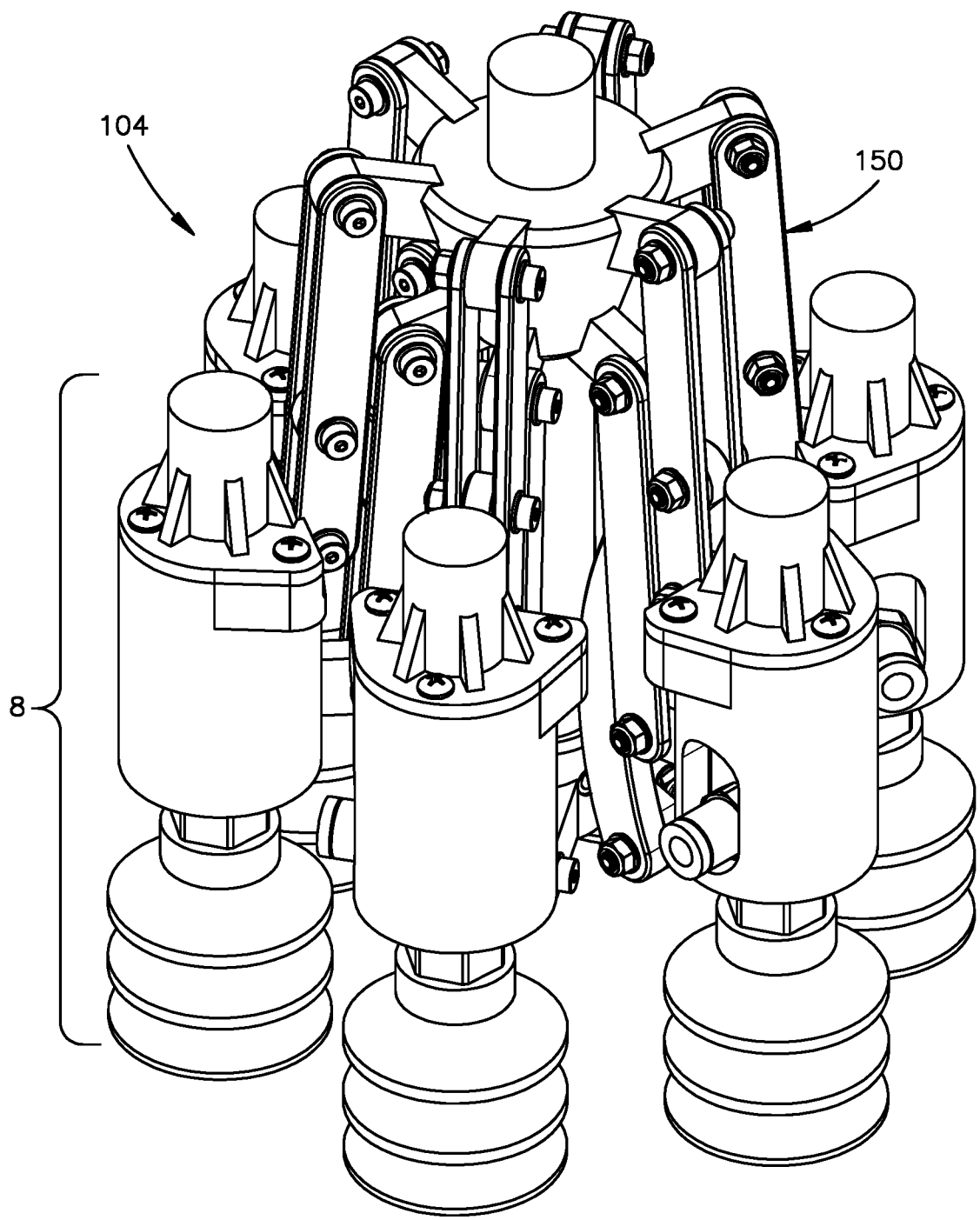
FIG. 7 shows a perspective view of a gripping assembly according to another embodiment of an end-of-arm tool, shown in a first, contracted configuration.

Referring now to FIGS. 7 through 9, another embodiment of a gripping assembly 104 will be described that employs alternative linkage 150 arrangements for connecting each suction cup assembly 8 to the actuation assembly 6 in a manner allowing an adjustable distance D between each suction cup assembly 8 and the actuation assembly 6.

As shown in FIGS. 8 and 9, each linkage 150 of the present embodiment includes a first upper arm 151, a second upper arm 152, and a lower arm 153. The first and second upper arms 151, 152 are also referred to herein as a pair of upper arms 151, 152. As described above, the body 24 also forms an arm of the linkage 150. In each linkage 150, the first upper arm 151 has a first or proximal end 158 rotatably coupled to the mount 10 and a second or distal end 160 rotatably coupled to the body 24. The second upper arm 152 has a first end 162 rotatably coupled to the mount 10 and a second end 164 rotatably coupled to the body 24. The lower arm 153 has a first end 166 rotatably coupled to the carriage 22 and a second end 168 rotatably coupled to the body 24.

The second ends 162, 164 of the first and second upper arms 151, 152 are preferably both coupled to a side of the body 24 that faces the central axis 20. Stated differently, the first and second upper arms 151, 152 are preferably coupled to a portion of the body 24 closest to the central axis 20 along the radial direction R. Thus, it can be said that the first and second upper arms 151, 152 are coupled to the "near" side of the body 24. The first and second upper arms 151, 152 are preferably configured to at least partially nest relative to each other in the contracted configuration C, thereby conserving space within the tool 2.

Each of the first plurality of arms, and thus each of the first and second upper arms 151, 152, can be rotatably coupled to the mount 10 and to their associated bodies 24 at joints, such as a plurality of pin joints, for example. The pin joints connecting the upper arms 151, 152 to the mount 10 can be referred to as "upper" or "mount" pin joints, which can include: a first pin joint 171 that connects the first end 158 of the first upper arm 151 to the mount 10; and a second pin joint 172 that connects the first end 162 of the second upper arm 152 to the mount 10. The mount 10 can include a first or upper plurality of extension members or tabs 191 spaced around a circumference of the mount 10 and a second or lower plurality of extension members or tabs 191 also spaced around the circumference of the mount 10. The first tabs 191 are configured to house the first pin joints 171 of the linkages 150, and the second tabs 192 are configured to house the second pin joints 172 of the linkages 150. Each of the tabs 191, 192 can extend radially away from the central axis 20 so as to increase the circumferential distance between circumferentially adjacent first pin joints 171 and circumferentially adjacent second pin joints 172 of the gripping assembly 104, thereby allowing the tool 2 to carry more suction cup assemblies 8. In each linkage 150, the first tab 191 is preferably positioned above the second tab 192 with respect to the first direction X, thereby positioning the first pin joint 171 above the second pin joint 172 with respect to the first direction X.

A third pin joint 173 can connect the second end 160 of the first upper arm 151 to the body 24. A fourth pin joint 174 can connect the second end 164 of the second upper arm 152 to the body 24. The third pin joint 173 can be located on a third extension member or tab 193 of the body 24 that extends radially toward the central axis 20. The fourth pin joint 174 can be located on a fourth extension member or tab 194 of the body 24 that extends radially toward the central axis 20. In each linkage 150, the third tab 193 is preferably positioned above the fourth tab 194 with respect to the first direction X, thereby positioning the third pin join 173 above the fourth pin joint 174 with respect to the first direction X. As shown, in each linkage 150, the first pin join 171 can be positioned radially outward of the second pin joint 172, while the fourth pin joint 174 is positioned radially inward of the third pin joint 173, whereby the relative spacing of pin joints 171-174 causes the first and second upper arms 151, 152 to remain parallel with each other as the linkage 150 moves the suction cup assembly 8 between the contracted configuration C (FIGS. 7 and 8) and the expanded configuration E (FIG. 9). Additionally, the foregoing arrangement of the first and second upper arms 151, 152 and the first, second, third, and fourth pin joints 171, 172, 173, 174 maintains the body axis 25 (and thus also the body 24) parallel with the central axis 20 and thus aligned along the first direction X during movement of the linkage 50 between the contracted and expanded configurations C, E. Additionally, the linkage 150 causes the body 24 to move proximally along the first direction X as the body 24 moves outwardly along the radial direction R.

Each of the second plurality of arms, and thus the lower arms 153 of the linkages 150, can be rotatably coupled to the carriage 22 at additional joints, such as additional pin joints. The pin joints connecting the lower arm 153 to the carriage 22 can be referred to as "lower" or "carriage" pin joints, which include fifth pin joints 175 connecting the first ends 166 of the lower arms 153 to the carriage 22. The carriage 22 can include a fifth plurality of extension members or tabs 195, which are spaced around a circumference of the carriage 22 and are configured to house the fifth pin joints 175. Each of the fifth tabs 195 can extend radially away from the central axis 20 so as to increase the circumferential distance between circumferentially adjacent fifth pin joints 175. The second end 168 of each lower arm 153 can be rotatably coupled to directly to one of the first and upper arms 151, 152. As shown, the second end 168 of the lower arm 153 can be rotatably coupled to the first upper arm 151 at a sixth pin joint 176 located between the first and second ends 158, 160 of the first upper arm 151. Because the lower arm 153 is rotatably coupled to the first upper arm 151, which is in turn rotatably coupled to the body 24, it can be said that the lower arm 153 is rotatably coupled to the body 24. As shown, each second upper arm 152 can include a pair of side members defining a slot therebetween, whereby the lower arm 153 extends through the slot of the second upper arm 152. One or more of the first upper arms 151 can also include a pair of side members defining a slot therebetween. The lower arm 153 preferably extends arcuately between its first and second ends 166, 168, thereby allowing the lower arm 153 to avoid mechanically interfering with the fourth pin joint 164, and also allowing the lower arm 153 to nest with the second upper arm 152, particularly in the contracted configuration C.

Similar to the embodiments described above with reference to FIGS. 1 through 6, the linkages 150 of the present embodiment are coupled to the carriage 22 so that translation of the carriage 22 along the first direction X between the first translational position P1 (FIGS. 7 and 8) and the second translational position P2 (FIG. 9) moves each of the linkages 150, and thus each of the suction cups 30, in unison along the radial direction R between the contracted configuration C (FIGS. 7 and 8) and the expanded configuration E (FIG. 9), thereby increasing and decreasing a total gripping area as needed. Additionally, the linkages 150 can be configured to provide relative spacing between the suction cup assemblies similar to that described above with reference to FIGS. 5 and 6. Moreover, the gripping assembly 104 can employ a number of linkages 150 associated suction cup assemblies 8 to provide any of the gripping areas described above with reference to FIGS. 5 and 6. Also, the gripping assembly 104 of the present embodiment can be employed with the drive mechanism 12, linear actuators 80, and sensors 94 described above.

Figure 10:
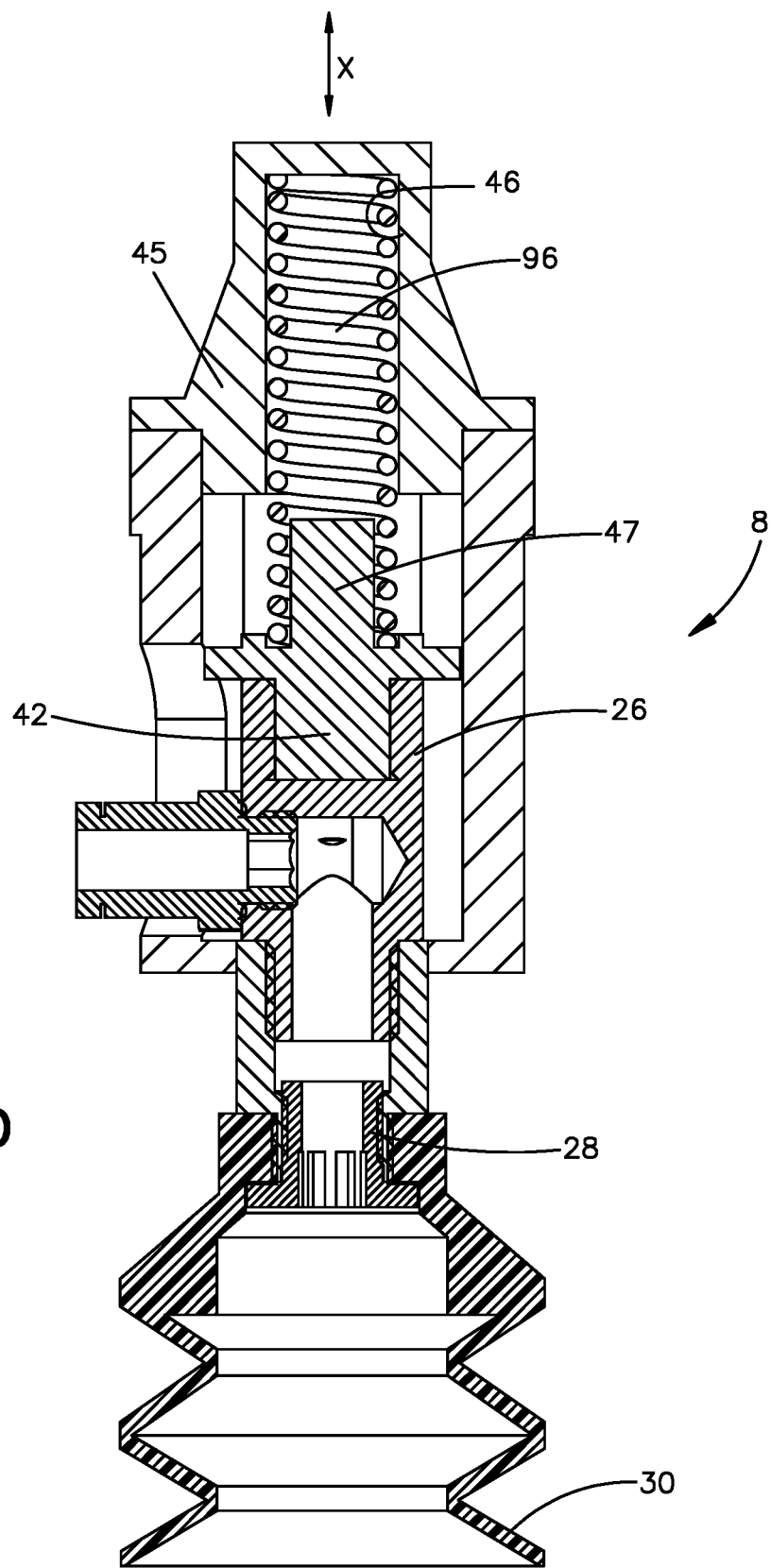
FIG. 10 shows a sectional side view of a suction cup assembly having a compliant member for providing the suction cup assembly with increased positional compliance, according to an embodiment of the present disclosure.

Referring now to FIG. 10, in some embodiments, the gripping assembly 4, 104 can include a plurality of compliant members 96 coupled to some of and up to all of the bodies 24. Each compliant member 96 is configured to provide positional compliance between the body 24 and a portion of the suction cup assembly 8 apart from the suction cup 30 along the first direction X, which thereby also provides the suction cups 30 with additional positional compliance along the first direction X. According to one example of such an embodiment, the suction cup assembly 8 can include a bonnet 45 coupled to a top end of the body 24. The bonnet 45 can define a bore, such as a central bore 46, which can be a blind bore. By way of non-limiting example, the compliant member 96 can be a coil spring, such as a compression coil spring, that is disposed within the bore 46 and extends annularly around a stem 47 extending upwardly from the cap 42. A first end of the spring 96 abuts a stop surface within the bore 46 and a second end of the spring 96 abuts a stop surface of the cap 42. The bonnet 46, spring 96, and cap 42 can be cooperatively configured so that the stem 47 advances upwardly within the bore 46 responsive to an upward force exerted against the suction cup mount 28 that overcomes the biasing force of the spring 96. It is to be appreciated that other compliant member types and configurations, however, are within the scope of the present embodiments.

Figure 11:
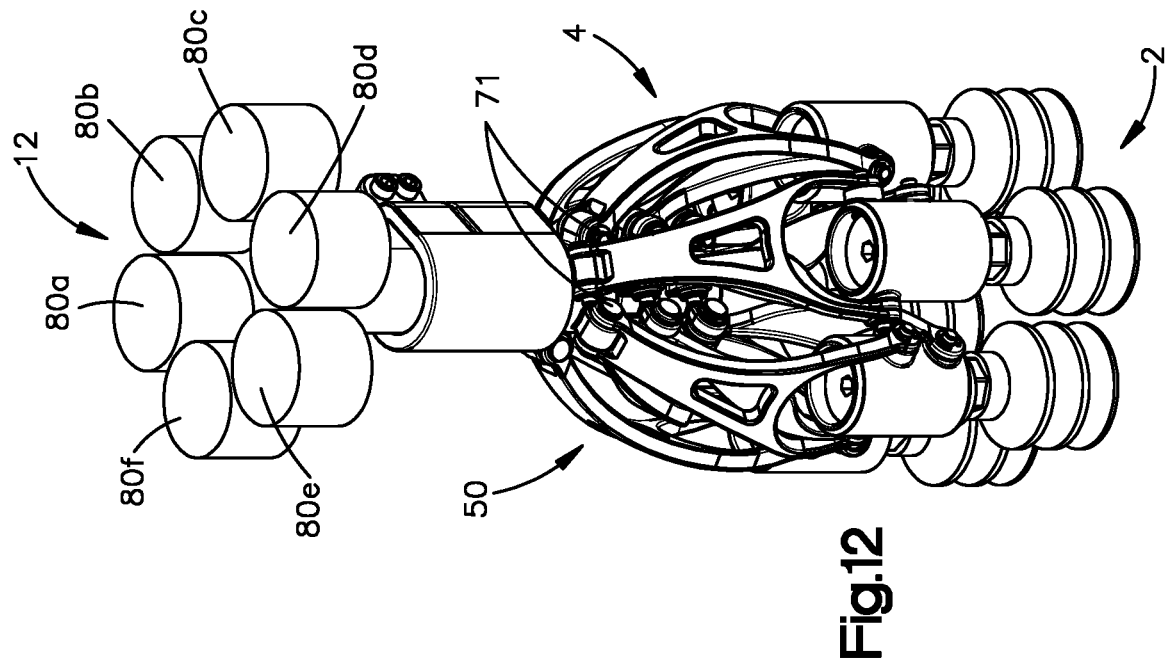
FIG. 11 shows to sectional diagram view of a multi-carriage, multi-actuator actuation assembly for independently expanding suction cup assemblies of the tool, according to an embodiment of the present disclosure.
Figure 12:
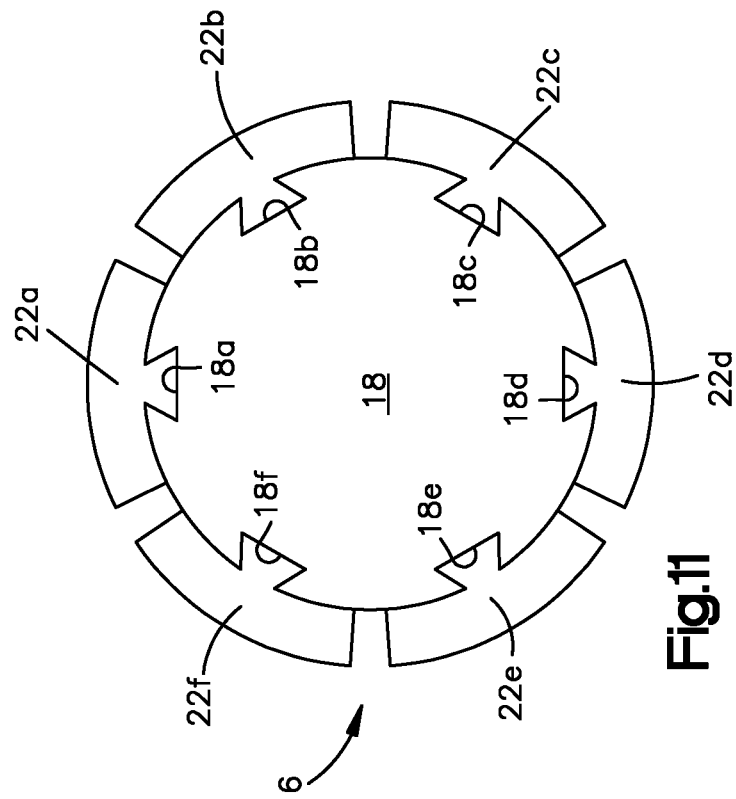
FIG. 12 shows a perspective view of a tool having the multi-carriage, multi-actuator actuation assembly illustrated in FIG. 11.

Referring now to FIGS. 11 and 12, an example embodiment for providing independent expansion of one or more of the suction cup assemblies 8 is illustrated as employed with the linkages 50 of FIGS. 1 through 6. It is to be appreciated, however, that the present example embodiment can also be employed with other linkage embodiments, including the linkages 150 described above with reference to FIGS. 8 through 9. Accordingly, one or more of the linkages 50, 150, and thus an associated one or more of the suction cup assemblies 8, can be expanded independently of at least one other linkage 50, 150 in the gripping assembly 4, 104. As shown, the actuation assembly 6 can include a plurality of carriages 22, such as first through sixth carriages 22a-f, which can each couple a respective linkage 50, 150 to a respective body 24. In such embodiments, the drive mechanism 12 can include a plurality of linear actuators 80, such as such as first through sixth linear actuators 80a-f, each configured to control translation of the associated carriage 22a-f along an associated linear guide member 18a-f between the first and second translational positions P1, P2 to expand and contract the linkages 50, 150 independently, as needed, to adapt to the surface area of the item to be gripped. In such embodiments, two or more of the linkages 50 could be locked into joint actuation together by a locking member, such as an arcuate locking pin that extends through two or more of the fifth pin joints 75, 175 (or the sixth pin joints 76 of linkages 50) of the carriage 22.

In additional embodiments, the gripping assembly 4 can include one or more expandable linkages 50, 150 for adjusting the distance D of each associated suction cup assembly 8, and also one or more static linkages that maintain each associated suction cup assembly 8 at a fixed distance D. In such embodiments, the fixed distance D can be less than the maximum distance D of the expandable suction cup assemblies 8, whereby the fixed suction cup assemblies 8 can remain closer to the central axis 20 than the expanded suction cup assemblies 8. By way of a non-limiting example, such a gripping assembly 4 can have a total of six (6) linkages and respective suction cup assemblies 8, wherein four (4) of the linkages 50, 150 (and their associated suction cup assemblies 8) are expandable, while two (2) of the linkages (and their associated suction cup assemblies 8) are static. It is to be appreciated that any combination of expandable and static linkages are within the scope of the present disclosure.

An example method of using an end-of-arm tool 2 of the present disclosure, such as to lift one or more of various items, can include the following steps: positioning the tool 2 over an item and identifying a target area of the item. The method includes identifying a target area of the item and translating at least one carriage 22 along a direction X oriented along a central axis 20 of a linear guide member 18 that connects the at least one carriage 22 to a mount 10, wherein the at least one carriage 22 is rotatably coupled to a plurality of upper arms 52 (or 151 and 152) that are also each rotatably coupled to a respective body 24 of a plurality of bodies, wherein each respective body 24 carries a suction cup 30 and is rotatably connected to a lower arm of a plurality of lower arms 54 and 56 (or 153) that are also rotatably coupled to the at least one carriage 22, such that the translating step responsively moves at least one of the respective bodies 24 along a radial direction R perpendicular to the central axis 20, thereby adjusting an effective gripping area collectively circumscribed by the suctions cups 30. The method includes lowering the suction cup 30 of the at least one of the respective bodies 24 into engagement with the item such that the suction cup 30 engages the item within the target area.

The step of identifying the target area can include: communicating data to a processor 92 in communication with a control unit 90 of the tool 2; and interpreting the data via the processor 92 so as to determine at least horizontal dimensions of the target area. The data can be obtained by one or more sensors 94. The step of communicating the data can include transmitting the data from the one or more sensors 94 to the processor 92.

In the present example method, each body 24 of the plurality of bodies defines a body axis 25, and the method further comprises maintaining each body axis 25 parallel with the central axis 20 during the translating step. The translating step can further include actuating a linear actuator 80 coupled to the at least one carriage 22. The linear actuator is configured to move the at least one carriage 22 along the direction X.

It is to be appreciated that the tool 2, and/or the various components and features of the tool 2 described above, can be employed according to additional methods, which are within the scope of the present disclosure.

It is to be appreciated that the size of the tool 2, including the size of its components, such as the linkages 50, 150 and the suction cup assemblies 8, can be scaled larger or smaller as desired for gripping items of certain sizes and/or weights.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A gripping tool for the end of a robotic arm, comprising:
   a mount;
   a linear guide member coupled to the mount and extending along a central axis;
   a carriage coupled to the linear guide member and configured to translate relative to the mount along a first direction oriented along the central axis;
   a first plurality of arms each rotatably coupled to the mount;
   a second plurality of arms each rotatably coupled to the carriage; and a plurality of bodies each carrying a suction cup configured to grip a surface of an item, each body defining a body axis, each body rotatably connected to 1) at least one of the first plurality of arms and 2) at least one of the second plurality arms, wherein each body in combination with the respective at least one of the first plurality of arms, the respective at least one of the second plurality of arms, and the carriage defines a linkage configured to cause the body to move relative to the mount along the first direction and a radial direction perpendicular to the first direction while the body axis remains parallel to the central axis.

2. The gripping tool of claim 1, wherein the carriage is configured to translate relative to the mount between a first translational position and a second translational position, such that 1) when the carriage is at the first translational position, the body axis of the respective body is spaced from the central axis at a minimum distance, and 2) when the carriage is at the second translational position, the body axis of the respective body is spaced from the central axis at a maximum distance.

3. The gripping tool of claim 2, wherein the gripping tool is configured such that the minimum distance is substantially equivalent for each body, and the maximum distance is substantially equivalent for each body.

4. The gripping tool of claim 2, wherein the bodies of the plurality of bodies are arranged around the central axis so that the body axes of the plurality of bodies collectively define a regular polygon in a reference plane that is orthogonal to the central axis.

5. The gripping tool of claim 2, wherein each linkage includes a first arm and a second arm that are configured to at least partially nest relative to each other when the carriage is in the first translational position.

6. The gripping tool of claim 5, wherein each of the first plurality of arms is rotatably coupled to the mount at a respective pin joint of a plurality of upper pin joints, wherein the upper pin joints are staggered in alternating fashion along the first direction.

7. A tool for the end of a robotic arm, comprising:
a mount;
at least one linear guide member coupled to the mount and extending along a central axis;
at least one carriage coupled to the at least one linear guide member and configured to translate relative to the mount along a first direction oriented along the central axis;
a first plurality of arms each rotatably coupled to the mount;
a second plurality of arms each rotatably coupled to the at least one carriage; and
a plurality of bodies each carrying a suction cup configured to grip a surface of an item, each body defining a body axis, each body rotatably connected to 1) at least one of the first plurality arms and 2) at least one of the second plurality of arms,
wherein each body in combination with the respective at least one of the first plurality of arms, the at least one of the second plurality of arms, and the at least one carriage defines a linkage configured to cause the body to move relative to the mount along the first direction and a radial direction perpendicular to the first direction while the body axis remains parallel to the central axis.

8. The tool of claim 7, further comprising at least one linear actuator in communication with the at least one carriage, wherein the at least one linear actuator is configured to translate the at least one carriage along the at least one linear guide member.

9. The tool of claim 8, wherein the at least one linear actuator is selected from the group consisting of a servo motor, a stepper motor, a solenoid, a ball screw actuator, a lead screw actuator, a pneumatic actuator, and a rack-and-pinion drive actuator.

10. The tool of claim 8, wherein:
the at least one carriage comprises a plurality of carriages each coupled to a respective body of the plurality of bodies, and
the at least one linear actuator comprise a plurality of linear actuators each coupled to a respective carriage of the plurality of carriages and configured to translate the respective carriage independently so as to move the respective body relative to the mount along the first and second directions independently of a remainder of the plurality of bodies.

11. The tool of claim 7, wherein the tool is in electronic communication with a control unit, and each body carries one or more electronic sensors adapted to convey data regarding the respective body to the control unit.

12. The tool of claim 7, wherein the plurality of bodies comprises at least five bodies.

13. The tool of claim 7, wherein:
each of the first plurality of arms has a first end that is rotatably coupled to the mount at a first pin joint and a second end that is forked and is rotatably coupled to the respective body at second and third pin joints on opposite sides of the body, wherein the second and third pin joints are offset with respect to the first direction, and
the respective at least one of the second plurality of arms of each linkage includes a first lower arm and a second lower arm, the first lower arm is rotatably coupled to the respective body at one of the second and third pin joints, and the second lower arm is rotatably coupled to the respective body at a fourth pin joint that is positioned between the other of the second and third pin joints and the respective suction cup with respect to the first direction.

14. The tool of claim 7, wherein:
the respective at least one of the first plurality of arms of each linkage includes a first upper arm and a second upper arm positioned below the first upper arm with respect to the first direction, each of the first and second upper arms has a first end rotatably coupled to the mount and a second end rotatably coupled to the body, and
the respective at least one of the second plurality of arms of each linkage includes a single lower arm having a first end rotatably coupled to the carriage and a second end rotatably coupled to the first upper arm at a location between the first and second ends of the first arm.

15. The tool of claim 7, further comprising a plurality of compliant members each coupled to a respective body of the plurality of bodies, wherein each compliant member is configured to provide positional compliance between the body and the suction cup along the first direction.

16. A method of lifting various items, comprising:
positioning an end-of-arm tool over an item;
identifying a target area of the item;
translating at least one carriage along a direction oriented along a central axis of a linear guide member that connects the at least one carriage to a mount, wherein the at least one carriage is rotatably coupled to a plurality of upper arms that are also each rotatably coupled to a respective body of a plurality of bodies, wherein each respective body carries a suction cup and is rotatably connected to a lower arm of a plurality of lower arms that are also rotatably coupled to the at least one carriage, such that the translating step responsively moves at least one of the respective bodies along a radial direction perpendicular to the central axis, thereby adjusting an effective gripping area collectively circumscribed by the suctions cups; and lowering the suction cup of the at least one of the respective bodies into engagement with the item such that the suction cup engages the item within the target area.

17. The method of claim 16, wherein the identifying step comprises:

communicating data to a processor in communication with a control unit of the end-of-arm tool; and interpreting the data via the processor so as to determine at least horizontal dimensions of the target area.

18. The method of claim 17, wherein the data is obtained by one or more sensors, and the communicating step includes transmitting the data from the one or more sensors to the processor.

19. The method of claim 16, wherein each body of the plurality of bodies defines a body axis, and the method further comprises maintaining each body axis parallel with the central axis during the translating step.

20. The method of claim 16, wherein the translating step further comprises actuating a linear actuator coupled to the at least one carriage, the linear actuator configured to move the at least one carriage along the direction.

\* \* \* \* \*